(12) United States Patent
Hayashi

(10) Patent No.: US 10,023,012 B2
(45) Date of Patent: Jul. 17, 2018

(54) TIRE

(71) Applicant: BRIDGESTONE CORPORATION, Tokyo (JP)

(72) Inventor: Shintaro Hayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 71 days.

(21) Appl. No.: 15/102,999

(22) PCT Filed: Jan. 8, 2015

(86) PCT No.: PCT/JP2015/050372
§ 371 (c)(1),
(2) Date: Jun. 9, 2016

(87) PCT Pub. No.: WO2015/107973
PCT Pub. Date: Jul. 23, 2015

(65) Prior Publication Data
US 2016/0303918 A1    Oct. 20, 2016

(30) Foreign Application Priority Data

Jan. 15, 2014   (JP) ................................ 2014-004976

(51) Int. Cl.
*B60C 11/03*       (2006.01)
*B60C 11/13*       (2006.01)

(52) U.S. Cl.
CPC ...... *B60C 11/0327* (2013.01); *B60C 11/0302* (2013.01); *B60C 11/032* (2013.01);
(Continued)

(58) Field of Classification Search
CPC ..... B60C 2011/0358; B60C 2011/0374; B60C 2011/0381–2011/0383
See application file for complete search history.

(56) References Cited

U.S. PATENT DOCUMENTS 7,607,464 B2   10/2009   Murata
9,150,056 B2   10/2015   Sanae
(Continued)

FOREIGN PATENT DOCUMENTS

CN    1 01 76751 5 A     7/2010
CN    102725153 A        10/2012
(Continued)

OTHER PUBLICATIONS

Communication dated Jan. 25, 2017, from the European Patent Office in counterpart European application No. 15737281.4.
(Continued)

*Primary Examiner* — Jodi C Franklin
(74) *Attorney, Agent, or Firm* — Sughrue Mion, PLLC

(57) ABSTRACT

A tire includes primary inclined grooves and auxiliary inclined grooves. Each primary inclined groove has a first gently inclined portion and a first steeply inclined portion. Each auxiliary inclined groove has a second gently inclined portion and a second steeply inclined portion. Each primary inclined groove does not communicate with a circumferential groove on the tire equator line side and extends beyond a tread edge outward in a tire width direction. Each auxiliary inclined groove does not communicate with the circumferential groove on the tire equator line side, and does not reach the tread edge but terminates on the tire equator line side.

4 Claims, 3 Drawing Sheets

(52) U.S. Cl.
CPC ... *B60C 11/1323* (2013.01); *B60C 2011/0334* (2013.01); *B60C 2011/0341* (2013.01); *B60C 2011/0365* (2013.01); *B60C 2011/0372* (2013.01); *B60C 2011/0376* (2013.01); *B60C 2011/0381* (2013.01); *B60C 2011/0388* (2013.01)

(56) References Cited

U.S. PATENT DOCUMENTS

| | | | |
|---|---|---|---|
| 9,358,843 B2 | 6/2016 | Nakamura et al. | |
| 2006/0130950 A1 | 6/2006 | Murata | |
| 2009/0114323 A1 | 5/2009 | Yamane | |
| 2011/0308676 A1* | 12/2011 | Morozumi | B60C 11/032 152/153 |
| 2013/0020002 A1 | 1/2013 | Nakamura et al. | |
| 2013/0220499 A1 | 8/2013 | Sanae | |
| 2015/0020940 A1* | 1/2015 | Yasunaga | B60C 11/1323 152/209.24 |

FOREIGN PATENT DOCUMENTS

| | | |
|---|---|---|
| CN | 103287218 A | 9/2013 |
| EP | 2 202 097 A2 | 6/2010 |
| EP | 2 537 688 A2 | 12/2012 |
| EP | 2614967 A1 | 7/2013 |
| JP | 2006-151029 A | 6/2006 |
| JP | 2008-168703 A | 7/2008 |
| JP | 2009-101785 A | 5/2009 |
| JP | 2009-113652 A | 5/2009 |
| JP | 2015-020442 A | 2/2015 |
| WO | 2011/012977 A1 | 2/2011 |

OTHER PUBLICATIONS

International Search Report for PCT/JP2015/050372 dated Apr. 7, 2015.

* cited by examiner

TIRE

CROSS REFERENCE TO RELATED APPLICATIONS

This application is a National Stage of International Application No. PCT/JP2015/050372 filed Jan. 8, 2015, claiming priority based on Japanese Patent Application No. 2014-004976 filed Jan. 15, 2014, the contents of all of which are incorporated herein by reference in their entirety.

TECHNICAL FIELD

The present invention relates to a tire including, in a tread plan view: a pair of circumferential grooves formed respectively on opposite sides of a tire equator line; and a plurality of lug grooves formed on an outer side of at least one of the pair of circumferential grooves in a tire width direction.

BACKGROUND ART

As a tread pattern to improve drainage performance and grip performance, various tread patterns have heretofore been proposed. For example, there has been proposed a tire including a plurality of lug grooves extending from a tread edge to a circumferential groove in a tire width direction in a tread plan view. The plurality of lug grooves include inclined primary grooves and inclined auxiliary grooves, and the inclined primary grooves and the inclined auxiliary grooves are alternately provided in a tire circumferential direction. In the tire width direction, the length of each inclined primary groove is longer than the length of each inclined auxiliary groove (see for example Patent Literature 1).

CITATION LIST

Patent Literature

Patent Literature 1: Japanese Patent Application Publication No. 2009-101785

SUMMARY OF INVENTION

Technical Problem

However, in the above-described tire, since both of the inclined primary grooves and the inclined auxiliary grooves reach the tread edge, the rigidity of a shoulder portion having the inclined primary grooves and the inclined auxiliary grooves (a portion near the tread edge) is decreased. Thus, when a vehicle equipped with the tire turns in particular, the contact area is reduced, so that the rigidity of the shoulder portion is decreased, resulting in a decrease in the driving stability of the vehicle.

In view of this, the present invention has been made to solve the above-described problem, and an object of the present invention is to provide a tire that makes it possible to improve the driving stability while suppressing a decrease in the drainage performance.

Solution to Problem

A tire of the present invention includes, in a tread plan view: a pair of circumferential grooves formed respectively on opposite sides of a tire equator line and extending in a tire circumferential direction; and a plurality of lug grooves formed on an outer side of at least one circumferential groove of the pair of circumferential grooves in a tire width direction, in which the plurality of lug grooves include primary inclined grooves and auxiliary inclined grooves alternately formed in the tire circumferential direction, each of the primary inclined grooves does not communicate with the circumferential groove on the tire equator line side and extends beyond a tread edge outward in the tire width direction, each primary inclined groove includes: a first gently inclined portion located on the tire equator line side; and a first steeply inclined portion located on the tread edge side and continuing to the first gently inclined portion, an inclination angle of the first steeply inclined portion relative to the tire circumferential direction is larger than an inclination angle of the first gently inclined portion relative to the tire circumferential direction, each of the auxiliary inclined grooves does not communicate with the circumferential groove on the tire equator line side, and does not reach the tread edge but terminates on the tire equator line side, each auxiliary inclined groove includes: a second steeply inclined portion located on the tire equator line side; and a second gently inclined portion located on the tread edge side relative to the second steeply inclined portion, an inclination angle of the second steeply inclined portion relative to the tire circumferential direction is larger than an inclination angle of the second gently inclined portion relative to the tire circumferential direction.

The tire of the present invention may be such that each primary inclined groove includes: a first contacting groove wall provided on a side that comes into contact with a ground first in a tire rotation direction; and a later contacting groove wall provided on a side that comes into contact with the ground later in the tire rotation direction, and an inclination of the later contacting groove wall relative to the tire radial direction is larger than an inclination of the first contacting groove wall relative to the tire radial direction.

The tire of the present invention may be such that each primary inclined groove has an inner end located on an innermost side in the tire width direction, and in the tire width direction, a distance between the inner end and the one circumferential groove is 2.5% or more and 8.0% or less of a contact width which is a distance of the tread edge.

The tire of the present invention may be such that between the pair of circumferential grooves, no widthwise groove extending in the tire width direction is formed, and a plurality of hole portions located at predetermined intervals in the tire circumferential direction are formed.

The tire of the present invention may be such that a groove width of the primary inclined groove located on the tire equator line side is larger than a groove width of the primary inclined groove located on the tread edge side.

DESCRIPTION OF EMBODIMENTS

Figure 1:
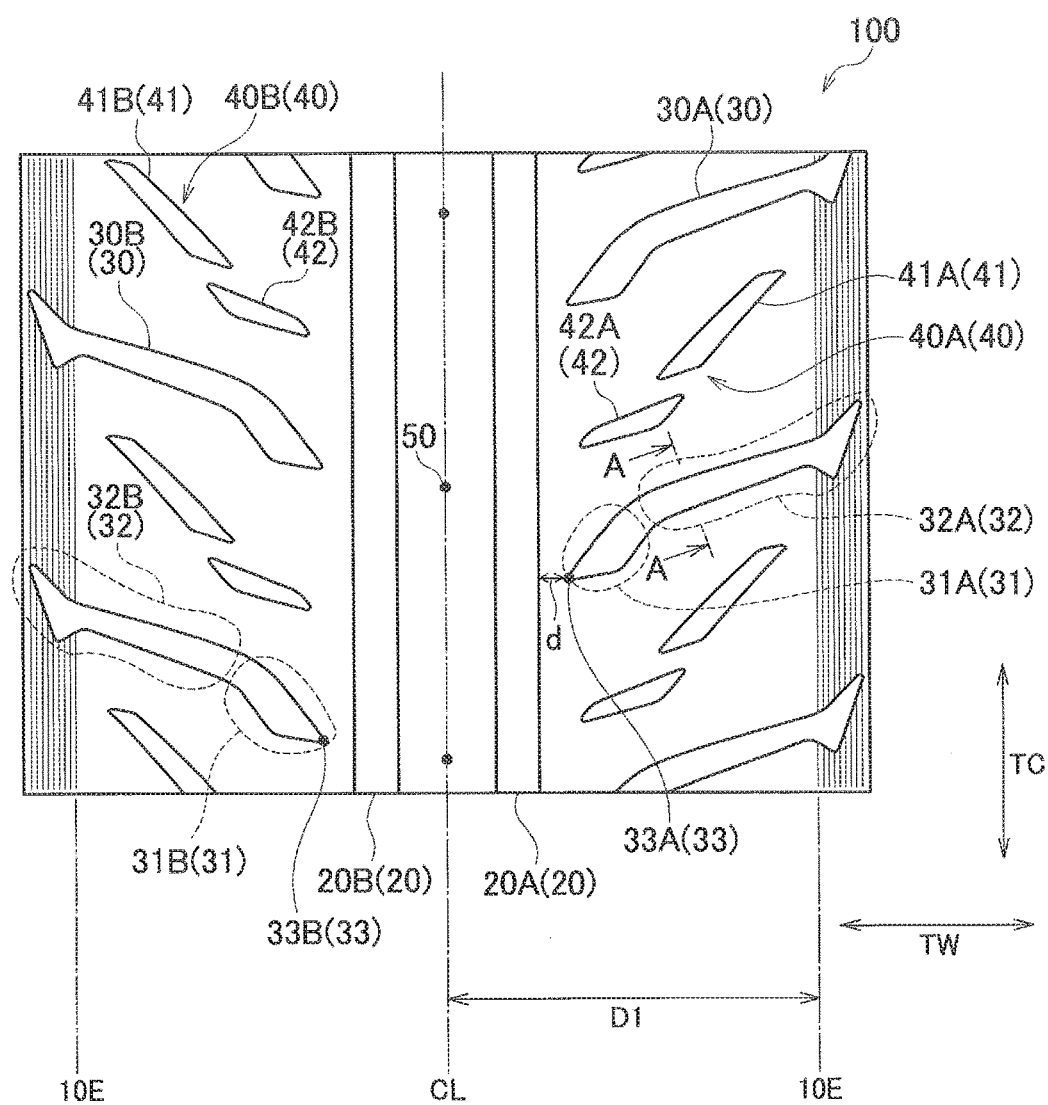
FIG. 1 is a diagram illustrating a tire 100 according to a first embodiment.

Hereinbelow, tires according to embodiments of the present invention will be described with reference to the drawings. Note that in the following description of the drawings, the same or similar portions are denoted by the same or similar reference signs.

It should be kept in mind that the drawings are schematic and proportions of dimensions and the like are different from actual ones. Accordingly, specific dimensions and the like should be determined in consideration of the following description. In addition, needless to say, the drawings contain portions different in dimensional relations and proportions from one another.

Summary of Embodiments

A tire according to an embodiment includes, in a tread plan view: a pair of circumferential grooves 20 formed to extend in a tire circumferential direction TC respectively on opposite sides of a tire equator line CL; and a plurality of lug grooves formed on an outer side of at least one circumferential groove 20 of the pair of circumferential grooves 20 in a tire width direction TW. The plurality of lug grooves include primary inclined grooves 30 and auxiliary inclined grooves 40 alternately formed in the tire circumferential direction TC.

Each of the primary inclined grooves 30 does not communicate with the one circumferential groove 20 on the tire equator line CL side. In addition, each primary inclined groove 30 extends beyond a tread edge 10E outward in the tire width direction TW. Each primary inclined groove 30 includes: a first gently inclined portion 31 located on the tire equator line CL side; and a first steeply inclined portion 32 located on the tread edge 10E side and continuing to the first gently inclined portion 31.

The first steeply inclined portion 32 is located more distant from the tire equator line CL than the first gently inclined portion 31 in the tire width direction TW. The first steeply inclined portion 32 continues to the first gently inclined portion 31 and extends beyond the tread edge 10E outward in the tire width direction TW.

An inclination angle of the first steeply inclined portion 32 relative to the tire circumferential direction TC is larger than an inclination angle of the first gently inclined portion 31 relative to the tire circumferential direction TC.

Each of the auxiliary inclined grooves 40 does not communicate with the one circumferential groove 20 on the tire equator line CL side. In addition, each auxiliary inclined groove 40 does not reach the tread edge 10E but terminates on the tire equator line CL side, that is, before the tread edge 10E. Each auxiliary inclined groove 40 includes: a second steeply inclined portion 42 located on the tire equator line CL side; and a second gently inclined portion 41 located on the tread edge 10E side relative to the second steeply inclined portion 42.

The second gently inclined portion 41 is located more distant from the tire equator line CL than the second steeply inclined portion 42 in the tire width direction TW. As illustrated in FIG. 1, the second gently inclined portion 41 does not continue to the second steeply inclined portion 42, and does not extend beyond the tread edge 10E outward in the tire width direction TW.

An inclination angle of the second steeply inclined portion 42 relative to the tire circumferential direction TC is larger than an inclination angle of the second gently inclined portion 41 relative to the tire circumferential direction.

In the embodiment, the auxiliary inclined groove 40 does not reach the tread edge 10E but terminates on the tire equator line CL side. This allows the rigidity of a portion near the tread edge 10E to be maintained. Accordingly, a reduction in the contact area when the vehicle equipped with the tire turns is suppressed, and a decrease in the driving stability in turning is also suppressed. On the other hand, although the auxiliary inclined groove 40 does not reach the tread edge 10E but terminates on the tire equator line CL side, the auxiliary inclined groove 40 includes the second gently inclined portion 41 located on the tread edge 10E side relative to the second steeply inclined portion 42. Accordingly, the drainage performance is maintained by the second gently inclined portion 41.

In the embodiment, the pair of circumferential grooves 20 formed respectively on the opposite sides of the tire equator line CL suppress a decrease in the rigidity of a portion containing the tire equator line CL. Accordingly, a decrease in the steering initial response performance is suppressed. It is thus possible to improve the drainage performance while suppressing a decrease in the driving stability.

In the embodiment, since the primary inclined groove 30 does not communicate with the circumferential groove 20, a decrease in the rigidity of a portion between the circumferential groove 20 and an inner end 33 of the primary inclined groove 30 is suppressed, and a decrease in the driving stability in turning is suppressed. On the other hand, since the primary inclined groove 30 extends beyond the tread edge 10E outward in the tire width direction TW, this allows for drainage outward in the tire width direction TW.

In the embodiment, since the primary inclined groove 30 includes the first gently inclined portion 31 located on the tire equator line CL side, this allows for efficient drainage along a flow line of drainage associated with rotation of the tire. Here, if the entire primary inclined groove 30 is formed of the first gently inclined portion 31, the primary inclined groove 30 is likely to be deformed by lateral stress which is generated when the vehicle equipped with the tire turns. However, since the primary inclined groove 30 includes the first steeply inclined portion 32 located on the tread edge 10E side and continuing to the first gently inclined portion 31, the deformation of the primary inclined groove 30 (the first steeply inclined portion 32) due to the lateral stress is suppressed, thereby improving the drainage performance while maintaining the driving stability in turning.

In the embodiment, the plurality of lug grooves include the primary inclined grooves 30 and the auxiliary inclined grooves 40 alternately formed in the tire circumferential direction TC. Accordingly, a local decrease in the rigidity is suppressed as compared to a case where all the lug grooves are formed of the primary inclined grooves 30.

In the embodiment, the primary inclined groove 30 includes the first gently inclined portion 31 and the first steeply inclined portion 32 in this order from the tire equator line CL side, and the auxiliary inclined groove 40 includes the second steeply inclined portion 42 and the second gently inclined portion 41 in this order from the tire equator line CL side. Accordingly, there is no portion where the rigidity is locally low in the tire width direction TW, which means that the tread has a good balance of the rigidity, making it possible to achieve a favorable driving stability in turning.

First Embodiment (Tire)

Hereinafter, a tire according to a first embodiment will be described. FIG. 1 is a diagram illustrating a tire 100 according to the first embodiment. Specifically, FIG. 1 is a diagram illustrating a tread plan view of the tire 100, and illustrates a tread pattern of the tire 100.

A rotational direction of the tire is referred to as a tire circumferential direction TC, and a width direction of the tread is referred to as a tire width direction TW. In addition, a radial direction of the tire is referred to as a tire radial direction TR.

As illustrated in FIG. 1, the tire 100 includes a pair of circumferential grooves 20, primary inclined grooves 30, auxiliary inclined grooves 40, and a plurality of hole portions 50.

The circumferential grooves 20 are grooves extending in the tire circumferential direction TC, and are formed respectively on opposite sides of a tire equator line CL. Each of the circumferential grooves 20 may be a straight groove having no amplitude in the tire width direction TW as seen in a cross section taken in the tire width direction TW, or each of the circumferential grooves 20 may be a zigzag groove having an amplitude in the tire width direction TW as seen in the cross section taken in the tire width direction TW. In the first embodiment, as the circumferential grooves 20, a circumferential groove 20A and a circumferential groove 20B are provided.

The primary inclined grooves 30 are lug grooves formed on an outer side of each circumferential groove 20 in the tire width direction TW. As the primary inclined grooves 30, primary inclined grooves 30A that are formed on an outer side of the circumferential groove 20A in the tire width direction TW; and primary inclined groove 30B that are formed on an outer side of the circumferential grooves 20B in the tire width direction TW are provided.

Specifically, each primary inclined groove 30 does not communicate with the circumferential groove 20 on the tire equator line CL side. In addition, each primary inclined groove 30 extends beyond the tread edge 10E outward in the tire width direction TW.

Here, FIG. 1 illustrates a part (tread) including a portion which comes into contact with the ground in a state where the load on the tire 100 is equal to the maximum loading condition and the internal pressure of the tire 100 is equal to the standard internal pressure. A pair of the tread edges 10E are the opposite edges, in the tire width direction TW, of the portion which comes into contact with the ground, in a state where the load on the tire 100 is equal to the maximum loading condition and the internal pressure of the tire 100 is equal to the standard internal pressure. Note that the maximum loading condition and the standard internal pressure are as specified by JATMA.

Each primary inclined groove 30 includes: a first gently inclined portion 31 located on the tire equator line CL side; and a first steeply inclined portion 32 located on the tread edge 10E side and continuing to the first gently inclined portion 31.

The first steeply inclined portion 32 is located more distant from the tire equator line CL than the first gently inclined portion 31 in the tire width direction TW. The first steeply inclined portion 32 continues to the first gently inclined portion 31 and extends beyond the tread edge 10E outward in the tire width direction TW.

An inclination angle of the first steeply inclined portion 32 relative to the tire circumferential direction TC is larger than an inclination angle of the first gently inclined portion 31 relative to the tire circumferential direction TC.

Figure 2:
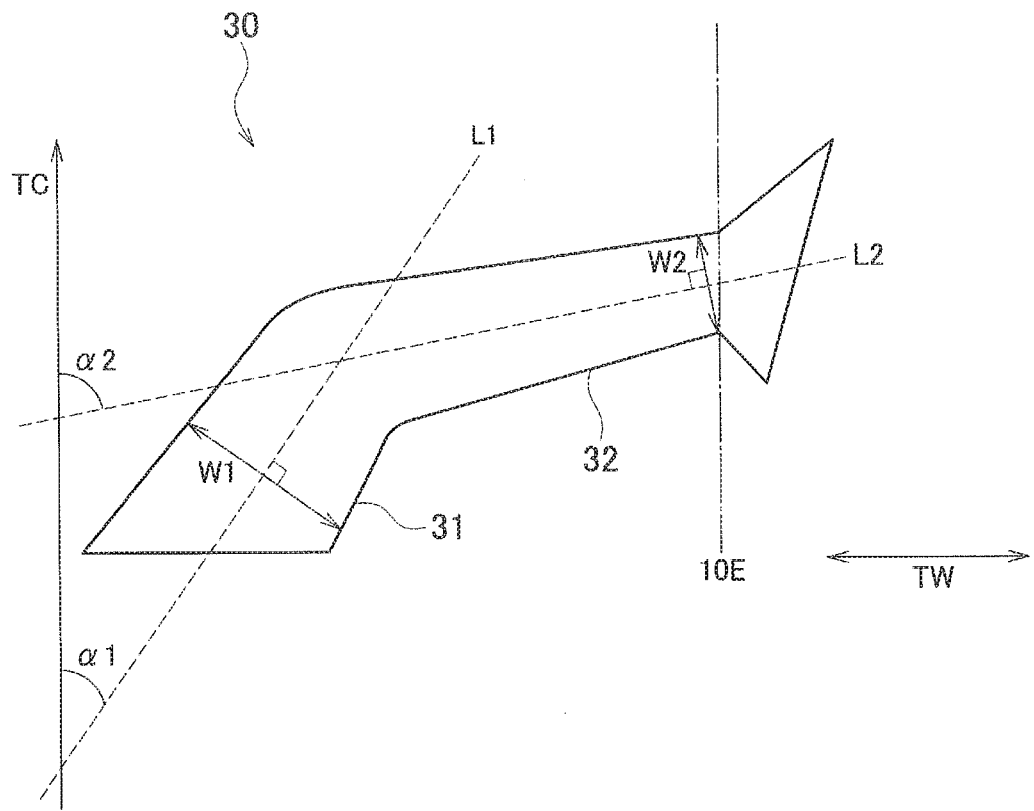
FIG. 2 is a diagram for describing a groove width of a primary inclined groove 30 according to the first embodiment.

Here, the inclination angle of the first gently inclined portion 31 is an angle $\alpha 1$ formed by the tire circumferential direction TC and a line connecting groove centers of the first gently inclined portion 31 (L1 indicated in FIG. 2, for example). The inclination angle of the first steeply inclined portion 32 is an angle $\alpha 2$ formed by the tire circumferential direction TC and a line connecting groove centers of the first steeply inclined portion 32 (L2 indicated in FIG. 2, for example).

For example, the inclination angle of the first gently inclined portion 31 is preferably 25° or more and 40° or less. With the inclination angle of the first gently inclined portion 31 being in the above-described range, this allows for efficient drainage from the leading side of the contact patch to the trailing side thereof when the vehicle is running in rain. The inclination angle of the first steeply inclined portion 32 is preferably 60° or more and 80° or less. With the inclination angle of the first steeply inclined portion 32 being in the above-described range, it is possible to maintain the block rigidity at a high level and to thus obtain a favorable driving stability, even when a large lateral force is applied in a direction from the tire equator line CL to the tread edge 10E due to cornering or the like.

In the first embodiment, each primary inclined groove 30 has an inner end 33 located on the innermost side in the tire width direction TW. In the tire width direction TW, a distance d between the inner end 33 (here, an inner end 33A) and the circumferential groove 20 (here, the circumferential groove 20A) is preferably 2.5% or more and 8.0% or less of a contact width D1 which is a distance of the tread edge 10E, (i.e. a contact width D1 which is a distance between the tread edge 10E and the tire equator line CL). With the distance d being 2.5% or more of the contact width D1, it is possible to sufficiently improve the rigidity of a portion between the primary inclined groove 30 and the circumferential groove 20 (a portion near the tire equator line CL), thus improving the driving stability. Meanwhile, with the distance d being 8.0% or less of the contact width D1, it is possible to sufficiently obtain the drainage performance effected by forming the primary inclined groove 30. Further, the distance d is more preferably 3% or more and 5% or less of the contact width D1. This makes it possible to appropriately achieve both of the driving stability and the drainage performance.

Note that in the tire width direction TW, a distance d between an inner end 33B and the circumferential groove 20B is also preferably 2.5% or more and 8.0% or less of the contact width D1, like the distance d between the inner end 33A and the circumferential groove 20A. Further, the distance d is more preferably 3% or more and 5% or less of the contact width D1.

Each auxiliary inclined groove 40 is a lug groove formed on an outer side of the circumferential groove 20 in the tire width direction TW. As the auxiliary inclined grooves 40, auxiliary inclined grooves 40A, which are formed on an outer side of the circumferential groove 20A in the tire width direction TW, and auxiliary inclined grooves 40B, which are formed on an outer side of the circumferential groove 20B in the tire width direction TW, are provided.

Specifically, each auxiliary inclined groove 40 does not communicate with the circumferential groove 20 on the tire equator line CL side. In addition, each auxiliary inclined groove 40 does not reach the tread edge 10E but terminates on the tire equator line CL side, that is, before the tread edge 10E. In other words, each auxiliary inclined groove 40 is formed between the circumferential groove 20 and the tread edge 10E.

Each auxiliary inclined groove 40 includes: a second steeply inclined portion 42 located on the tire equator line CL side; and a second gently inclined portion 41 located on the tread edge 10E side relative to the second steeply inclined portion 42.

The second gently inclined portion 41 is located more distant from the tire equator line CL than the second steeply inclined portion 42 in the tire width direction TW. As illustrated in FIG. 1, the second gently inclined portion 41 does not continue to the second steeply inclined portion 42, and does not extend beyond the tread edge 10E outward in the tire width direction TW.

An inclination angle of the second steeply inclined portion 42 relative to the tire circumferential direction TC is larger than an inclination angle of the second gently inclined portion 41 relative to the tire circumferential direction TC.

Here, the inclination angle of the second steeply inclined portion 42 is an angle formed by the tire circumferential direction TC and a line connecting groove centers of the second steeply inclined portion 42. The inclination angle of the second gently inclined portion 41 is an angle formed by the tire circumferential direction TC and a line connecting groove centers of the second gently inclined portion 41.

For example, the inclination angle of the second steeply inclined portion 42 is preferably 65° or more and 85° or less relative to the tire circumferential direction TC. Further, the inclination angle of the second steeply inclined portion 42 is more preferably 70° or more and 80° or less relative to the tire circumferential direction TC. With the inclination angle of the second steeply inclined portion 42 being in the above-described range, it is possible to maintain the block rigidity in the lateral direction at a high level and to thus obtain an excellent driving stability, when a lateral force is generated due to cornering or the like.

The inclination angle of the second gently inclined portion 41 is preferably 35° or more and 55° or less relative to the tire circumferential direction TC. Further, the inclination angle of the second gently inclined portion 41 is more preferably 40° or more and 50° or less relative to the tire circumferential direction TC. With the inclination angle of the second gently inclined portion 41 being in the above-described range, it is possible to obtain a favorable drainage performance.

Here, in the primary inclined groove 30, the inclination angle of the first gently inclined portion 31 located on the tire equator line CL side is smaller than the inclination angle of the first steeply inclined portion 32 located on the tread edge 10E side.

On the other hand, in the auxiliary inclined groove 40, the inclination angle of the second steeply inclined portion 42 located on the tire equator line CL side is larger than the inclination angle of the second gently inclined portion 41 located on the tread edge 10E side.

By employing such configuration, the gently inclined portions and the steeply inclined portions are alternately arranged in the tire circumferential direction TC. For example, on the tire equator line CL side, the first gently inclined portions 31 of the primary inclined grooves 30 and the second steeply inclined portions 42 of the auxiliary inclined grooves 40 are alternately arranged while on the tread edge 10E side, the first steeply inclined portions 32 of the primary inclined grooves 30 and the second gently inclined portions 41 of the auxiliary inclined grooves 40 are alternately arranged. This makes it possible to achieve both of the drainage performance and the driving stability without causing non-uniformity in the drainage performance or non-uniformity in the rigidity. It should be kept in mind that as the larger the inclination angles of the grooves are, the higher the drainage performance is while the smaller the inclination angles of the grooves are, the higher the rigidity in the lateral direction is to thus improve the driving stability.

In the first embodiment, each second steeply inclined portion 42 and the corresponding second gently inclined portion 41 are preferably discontinuous as illustrated in FIG. 1. This improves the rigidity of the discontinuous portion between the second steeply inclined portion 42 and the second gently inclined portion 41, thus improving the driving stability. However, the second steeply inclined portion 42 and the second gently inclined portion 41 may be continuous.

The hole portions 50 are formed between the pair of circumferential grooves 20, and are located at predetermined intervals in the tire circumferential direction TC. The predetermined intervals are not particularly limited, but are preferably such intervals that 20 to 30 hole portions 50 are provided on one round of the tire 100 in the tire circumferential direction TC. Here, it should be kept in mind that no widthwise grooves extending in the tire width direction TW are provided between the pair of circumferential grooves 20. This makes it possible to appropriately dissipate heat through the hole portions 50 during continuous running of the vehicle equipped with the tire 100, and also to sufficiently improve the rigidity of the portion between the pair of circumferential grooves 20 (the portion near the tire equator line CL), thus improving the driving stability.

The area of each hole portion 50 on the surface of the tire 100 is preferably 1 mm$^2$ or more and 4 mm$^2$ or less, for example. Setting the area of each hole portion 50 at 1 mm$^2$ or more makes it possible to obtain sufficient heat dissipation effect. Setting the area of each hole portion 50 at 4 mm$^2$ or less suppresses a decrease in the block rigidity, thus suppressing deterioration in the driving stability. The depth of each hole portion 50 in the tire radial direction TR is preferably 0.7 mm or more and 5 mm or less. Setting the depth of each hole portion 50 at 0.7 mm or more makes it possible to obtain sufficient heat dissipation effect. Setting the depth of each hole portion 50 at 5 mm or less suppresses a decrease in the block rigidity, thus suppressing deterioration in the driving stability.

(Groove Width of Primary Inclined Groove)

Hereinbelow, the groove width of the primary inclined groove according to the first embodiment will be described. FIG. 2 is a diagram for describing the groove width of the primary inclined groove 30 according to the first embodiment.

As illustrated in FIG. 2, the groove width (here, W1) of the primary inclined groove 30 located on the tire circumferential direction TC side is larger than the groove width W2 of the primary inclined groove 30 located on the tread edge 10E side.

Here, the groove width of the primary inclined groove 30 is a groove width in a direction orthogonal to a line connecting groove centers of the primary inclined groove 30. Accordingly, the groove width W1 is a groove width orthogonal to the line connecting the groove centers of the first gently inclined portion 31 (for example, L1 illustrated in FIG. 2). The groove width W2 is a groove width orthogonal to the line connecting the groove centers of the first steeply inclined portion 32 (for example, L2 illustrated in FIG. 2). The groove width of the primary inclined groove 30 may become smaller gradually from the tire circumferential direction TC toward the tread edge 10E.

Here, setting the groove width W2 smaller than the groove width W1 makes it possible to maintain the rigidity and contact area for the lateral stress generated when the vehicle equipped with the tire 100 turns. On the other hand, setting the groove width W1 larger than the groove width W2 improves the drainage performance.

(Groove Walls of Primary Inclined Groove)

Figure 3:
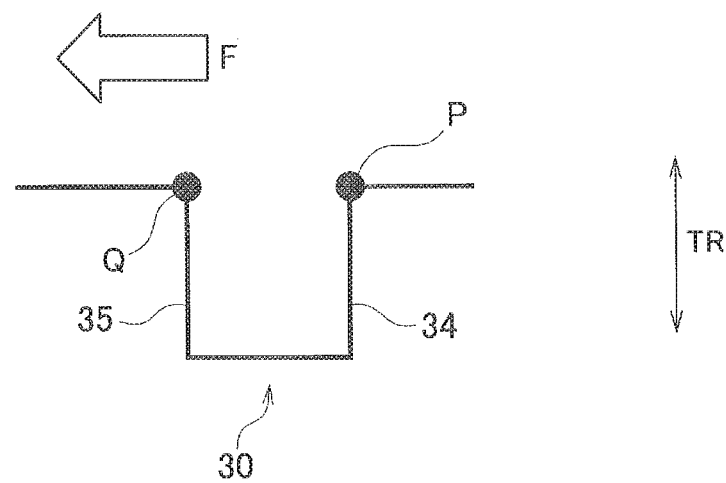
FIG. 3 is a diagram for describing groove walls of the primary inclined groove 30 according to the first embodiment.
Figure 4:
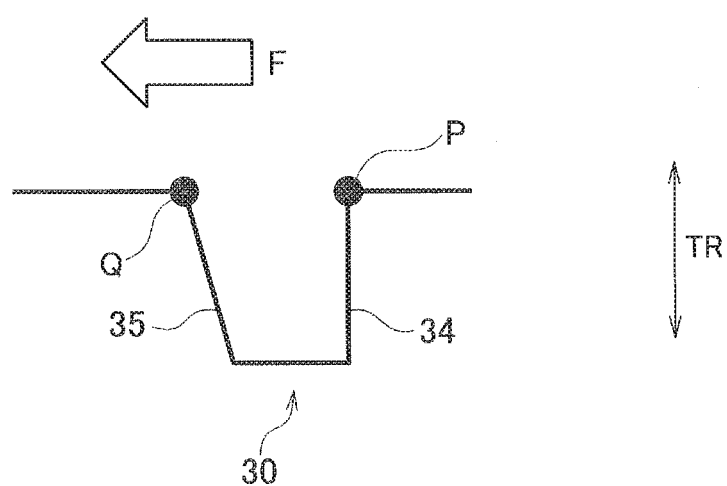
FIG. 4 is a diagram for describing groove walls of the primary inclined groove 30 according to the first embodiment.

Hereinafter, groove walls of the primary inclined groove according to the first embodiment will be described. FIGS. 3 and 4 are diagrams for describing groove walls of the primary inclined groove 30 according to the first embodiment.

As illustrated in FIGS. 3 and 4, each primary inclined groove 30 includes: a first contacting groove wall 34 provided on the side that comes into contact with the ground first in a tire rotation direction; and a later contacting groove wall 35 provided on the side that comes into contact with the ground later in the tire rotation direction. In FIG. 3, the position of the first contacting groove wall 34 on the surface of the tire 100 is denoted by a point P and the position of the later contacting groove wall 35 is denoted by a point Q.

Here, as illustrated in FIG. 3, an inclination of the first contacting groove wall 34 relative to the tire radial direction TR may be equal to an inclination of the later contacting groove wall 35 relative to the tire radial direction TR (for example, 0°). Here, the inclination of each groove wall of the primary inclined groove means an angle formed by the tire radial direction TR and the groove wall.

However, in such a case, a phenomenon may possibly occur in which the tread constituting the surface of the tire 100 is peeled off by a force (indicated by an arrow F in FIGS. 3 and 4) which the surface of the tire 100 receives from the contact ground at a later contacting edge of the primary inclined groove 30.

For this reason, as illustrated in FIG. 4, the inclination of the later contacting groove wall 35 relative to the tire radial direction TR is preferably larger than the inclination of the first contacting groove wall 34 relative to the tire radial direction TR. Specifically, the later contacting groove wall 35 is preferably inclined relative to the tire radial direction TR such that an obtuse angle is formed by the later contacting groove wall 35 and the surface of the tire 100 (the surface on the side that comes into contact with the ground after the later contacting groove wall 35 in the tire rotation direction) in a case where the inclination of the first contacting groove wall 34 relative to the tire radial direction TR is 0°. This suppresses the phenomenon in which the tread constituting the surface of the tire 100 is peeled off at the later contacting edge of the primary inclined groove 30.

(Operations and Effects)

In the first embodiment, the auxiliary inclined groove 40 does not reach the tread edge 10E but terminates on the tire equator line CL side. This allows the rigidity of a portion near the tread edge 10E to be maintained. Accordingly, a reduction in the contact area when the vehicle equipped with the tire 100 turns is suppressed, and a decrease in the driving stability in turning is also suppressed. On the other hand, although the auxiliary inclined groove 40 does not reach the tread edge 10E but terminates on the tire equator line CL side, the auxiliary inclined groove 40 includes the second gently inclined portion 41 located on the tread edge 10E side relative to the second steeply inclined portion 42. Accordingly, the drainage performance is maintained by the second gently inclined portion 41.

In the first embodiment, the pair of circumferential grooves 20 formed respectively on the opposite sides of the tire equator line CL suppress a decrease in the rigidity of a portion containing the tire equator line CL. Accordingly, a decrease in the steering initial response performance is suppressed. It is thus possible to improve the drainage performance while suppressing a decrease in the driving stability.

In the first embodiment, since the primary inclined groove 30 does not communicate with the circumferential groove 20, a decrease in the rigidity of a portion between the circumferential groove 20 and the inner end of the primary inclined groove 30 is suppressed, and a decrease in the driving stability in turning is suppressed. On the other hand, since the primary inclined groove 30 extends beyond the tread edge 10E outward in the tire width direction TW, this allows for drainage outward in the tire width direction TW.

In the first embodiment, since the primary inclined groove 30 includes the first gently inclined portion 31 located on the tire equator line CL side, this allows for efficient drainage along the flow line of drainage associated with rotation of the tire 100. Here, if the entire primary inclined groove is formed of the first steeply inclined portion, the primary inclined groove is likely to be deformed by lateral stress which is generated when the vehicle equipped with the tire 100 turns. However, since the primary inclined groove 30 includes the first steeply inclined portion 32 located on the tread edge 10E side and continuing to the first gently inclined portion 31, the deformation of the primary inclined groove 30 (the first steeply inclined portion 32) due to the lateral stress is suppressed, thereby improving the drainage performance while maintaining the driving stability in turning.

In the first embodiment, the plurality of lug grooves include the primary inclined grooves 30 and the auxiliary inclined grooves 40 alternately formed in the tire circumferential direction TC. Accordingly, a local decrease in the rigidity is suppressed as compared to a case where all the lug grooves are formed of the primary inclined grooves.

In the first embodiment, each primary inclined groove 30 includes the first gently inclined portion 31 and the first steeply inclined portion 32 in this order from the tire equator line CL side, and each auxiliary inclined groove 40 includes the second steeply inclined portion 42 and the second gently inclined portion 41 in this order from the tire equator line CL side. Accordingly, there is no portion where the rigidity is locally low in the tire width direction TW, which means that the tread has a good balance of the rigidity, making it possible to achieve a favorable driving stability in turning.

Other Embodiments

In the above-described embodiment, the plurality of lug grooves (the primary inclined grooves 30 and the auxiliary inclined grooves 40) formed on the opposite outer sides of the pair of circumferential grooves 20 have been described. However, the plurality of lug grooves (the primary inclined grooves 30 and the auxiliary inclined grooves 40) may be formed on the outer side of only at least one circumferential groove 20 of the pair of circumferential grooves 20. In such a case, lug grooves different from the primary inclined grooves 30 and the auxiliary inclined grooves 40 may be formed on the outer side of at least the other circumferential groove 20 of the pair of circumferential grooves 20.

Although not particularly mentioned in the embodiments, the primary inclined groove 30 and the auxiliary inclined groove 40 adjacent to each other in the tire circumferential direction TC are preferably arranged such that the concave portion of the primary inclined groove 30 and the concave portion of the auxiliary inclined groove 40 face each other in the tread plan view. This makes it possible to uniformly arrange portions that contribute to the drainage performance and portions that contribute to the driving stability.

Although the embodiments of the present invention have been described so far, these embodiments are only illustrative ones described for facilitating the understanding of the present invention, and thus the present invention is not limited to the embodiments. The technical scope of the present invention encompasses not only the specific technical matters disclosed in the above-described embodiments but also various changes, modifications, alternative techniques, and the like that are easily derived from the technical matters.

The present application claims the benefit of priority based on Japanese Patent Application No. 2014-004976 filed on Jan. 15, 2014, the entire contents of which are incorporated herein by reference.

INDUSTRIAL APPLICABILITY

According to the present invention, it is possible to provide a tire capable of improving the driving stability while suppressing a decrease in the drainage performance.

REFERENCE SIGNS LIST 20 circumferential groove
30 primary inclined groove
31 first gently inclined portion
32 first steeply inclined portion
33 inner end
34 first contacting groove wall
35 later contacting groove wall
40 auxiliary inclined groove
41 second gently inclined portion
42 second steeply inclined portion
50 hole portion
100 tire

The invention claimed is:

1. A tire comprising, in a tread plan view:
a pair of circumferential grooves formed respectively on opposite sides of a tire equator line and extending in a tire circumferential direction; and
a plurality of lug grooves formed on an outer side of at least one circumferential groove of the pair of circumferential grooves in a tire width direction, wherein
the plurality of lug grooves include primary inclined grooves and auxiliary inclined grooves alternately formed in the tire circumferential direction,
each of the primary inclined grooves does not communicate with the circumferential groove on the tire equator line side and extends beyond a tread edge outward in the tire width direction,
each primary inclined groove includes: a first gently inclined portion located on the tire equator line side; and a first steeply inclined portion located on the tread edge side and continuing to the first gently inclined portion,
an inclination angle of the first steeply inclined portion relative to the tire circumferential direction is larger than an inclination angle of the first gently inclined portion relative to the tire circumferential direction,
each of the auxiliary inclined grooves does not communicate with the circumferential groove on the tire equator line side, and does not reach the tread edge but terminates on the tire equator line side,
each auxiliary inclined groove includes: a second steeply inclined portion located on the tire equator line side; and a second gently inclined portion located on the tread edge side relative to the second steeply inclined portion,
an inclination angle of the second steeply inclined portion relative to the tire circumferential direction is larger than an inclination angle of the second gently inclined portion relative to the tire circumferential direction, wherein
each primary inclined groove includes: a first contacting groove wall provided on a side that comes into contact with a ground first in a tire rotation direction; and a later contacting groove wall provided on a side that comes into contact with the ground later in the tire rotation direction, and
an inclination of the later contacting groove wall relative to the tire radial direction is larger than an inclination of the first contacting groove wall relative to the tire radial direction.

2. The tire according to claim 1, wherein
each primary inclined groove has an inner end located on an innermost side in the tire width direction, and
in the tire width direction, a distance between the inner end and the one circumferential groove is 2.5% or more and 8.0% or less of a contact width which is a distance of the tread edge.

3. The tire according to claim 1, wherein
between the pair of circumferential grooves, no widthwise groove extending in the tire width direction is formed, and a plurality of hole portions located at predetermined intervals in the tire circumferential direction are formed.

4. The tire according to claim 1, wherein
a groove width of the primary inclined groove located on the tire equator line side is larger than a groove width of the primary inclined groove located on the tread edge side.

* * * * *